United States Patent Office 3,850,878
Patented Nov. 26, 1974

3,850,878
TRIS(HALOALKYL) N-HYDROCARBYLCARBA-
MATES AS FLAME RETARDANT AGENTS
Timothy P. Murtha, Ernest A. Zuech, and Roy A. Gray, Bartlesville, Okla., assignors to Phillips Petroleum Company
No Drawing. Filed Aug. 30, 1972, Ser. No. 284,704
Int. Cl. C07c 125/06; C09k 3/28
U.S. Cl. 260—45.9 R
9 Claims

ABSTRACT OF THE DISCLOSURE

Novel tris(haloalkyl) N-hdrocarbylcarbamates which are useful as flame retardants for polymeric materials are described. A preferred embodiment includes the use of di[3 - bromo - 2,2 - bis(bromomethyl)propyl]-1,6-hexamethylenedicarbamate as a flame retardant for polyolefin compositions.

---

This invention relates to tris(haloalkyl) N-hydrocarbylcarbamates, polymeric compositions containing said tris (haloalkyl) N-hydrocarbylcarbamates and the use of said tris(haloalkyl) N-hydrocarbylcarbamates as flame retardants for polymeric materials.

It is an object of this invention to provide novel compositions of matter. Another object of the invention is to provide compositions which are useful as flame retardants for polymeric materials. Additionally, it is an object to provide flame retardant polymeric compositions. These and other objects will be apparent from the written description and the appended claims.

In accordance with this invention, novel tris(haloalkyl) N-hydrocarbylcarbamates are produced. These carbamates have been found to be useful as flame retardant additives for polymeric materials. Another embodiment of this invention is flame retardant polymeric materials containing tris(haloalkyl) N-hydrocarbylcarbamates.

The tris(haloalkyl) N-hydrocarbylcarbamates of this invention can be represented by compounds of the formulas (I) and (II) set out hereafter:

(I)

wherein R represents a monovalent acyclic radical, a monovalent cyclic radical or a monovalent combination thereof containing up to 20 carbon atoms, X represents chlorine, bromine or iodine. Particularly preferred acyclic and cyclic radicals are aliphatic, alcyclic, aromatic hydrocarbyl radicals and combinations thereof including alkyl, cycloalkyl, alkenyl, cycloalkenyl, aryl, alkaryl, aralkyl and the like containing up to 10 carbon atoms. Examples of generally suitable tris(haloalkyl) N-hydrocarbylcarbamates of formula (I) are:

3-bromo-2,2-bis(bromomethyl)propyl N-phenyl-
  carbamate;
3-iodo-2,2-bis(bromomethyl)propyl N-methylcarbamate;
3-iodo-2,2-bis(iodomethyl)propyl N-n-butylcarbamate;
3-bromo-2,2-bis(iodomethyl)propyl N-n-hexylcarbamate;
3-iodo-2,2-bis(bromomethyl)propyl N-n-dodecyl-
  carbamate;
3-bromo-2,2-bis(iodomethyl)propyl N-n-eicosylcarba-
  mate;
3-bromo-2,2-bis(bromomethyl)propyl N-cyclohexyl-
  carbamate;
3-iodo-2,2-bis(bromomethyl)propyl N-3-cyclohexenyl-
  carbamate;
3-bromo-2,2-bis(bromomethyl)propyl N-benzylcarba-
  mate;
3-bromo-2,2-bis(bromomethyl)propyl N-2-butenylcar-
  bamate;
3-chloro-2,2-bis(bromomethyl)propyl N-n-hexylcar-
  bamate;
3-chloro-2,2-bis(chloromethyl)propyl N-p-tolylcarba-
  mate;
3-chloro-2,2-bis(bromomethyl)propyl N-phenylcar-
  bamate;
3-bromo-2,2-bis(chloromethyl)propyl N-2-butenylcar-
  bamate;
3-chloro-2,2-bis(chloromethyl)propyl N-3-cyclohexenyl-
  carbamate;

and the like, and mixtures thereof. The presently preferred tris(haloalkyl) N-hydrocarbylcarbamate of formula (I) is 3-bromo-2,2-bis(bromomethyl)propyl N-phenylcarbamate.

(II)
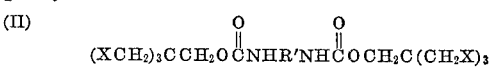

wherein R' represents a divalent acyclic radical, a divalent cyclic radical or a combination thereof containing up to 20 carbon atoms, X is as defined for formula (I). Particularly preferred acyclic and cyclic radicals are alkylene, alkenylene, cycloalkylene, cycloalkenylene, arylene, aralkylene and the like containing up to 10 carbon atoms. Examples of generally suitable tris(haloalkyl) N-hydrocarbylcarbamates of formula (II) are:

di[3-bromo-2,2-bis(bromomethyl)propyl]-1,6-hexa-
  methylenedicarbamate;
di[3-bromo-2,2-bis(chloromethyl)propyl]-2,6 tolylene-
  dicarbamate;
di[3-chloro-2,2-bis(bromomethyl)propyl]-2,4-tolylene-
  dicarbamate;
di[3-bromo-2,2-bis(bromomethyl)propyl]-1,4-phenyl-
  dicarbamate;
di[3-chloro-2-iodomethyl-2-bromomethyl-propyl]-1,20-
  eicosamethylenedicarbamate;
di[3-bromo-2,2-bis(bromomethyl)propyl]-1,4 cyclo-
  hexylenedicarbamate;
di[3-chloro-2,2-bis(bromomethyl)propyl]-1,8-octameth-
  ylenedicarbamate;
di[3-bromo-2,2-bis(bromomethyl)propyl]-1,4-(3-cyclo-
  hexenylene)dicarbamate;
di[3-bromo-2,2-bis(bromomethyl)propyl]isopropyl-
  idenedi-p-phenylenedicarbamate;
di[3-chloro-2,2-bis(chloromethyl)propyl]-1,6-hexa-
  methylenedicarbamate;
di[3-bromo-2,2-bis(chloromethyl)propyl]-1,4-(2-butenyl-
  ene)dicarbamate;
di[3-bromo-2,2-bis(chloromethyl)propyl]1,4-cyclohexyl-
  enedicarbamate;

and the like, and mixtures thereof. Examples of particularly suitable tris(haloalkyl) N-hydrocarbylcarbamates of formula (II) are di[3-bromo - 2,2 - bis(bromomethyl) propyl]-1,6-hexamethylenedicarbamate and di[3-bromo-2,2 - bis(bromomethyl)propyl - 2,4/2,6 - tolylenedicarbamate, and mixtures thereof.

Compounds of the type represented by formula (I) wherein X is replaced by Q, wherein Q is bromine or iodine, and compounds of the type of formula (II) are considered to be novel compositions of matter. 2,2,2-Tris-(chloromethyl)-ethyl N-isopropylcarbamate and 3-chloro-2,2 - bis(chloromethyl)propyl N - phenylcarbamate are known in the prior art for their relative hypnotic properties.

The carbamates of formula (I) can be prepared conveniently by well-known reactions including the reaction of trishaloalkanols, e.g., 3-halo-2,2-bis(halomethyl)-1-propanol with a monoisocyanate characterized by the formula (A)  

wherein R is as previously defined, in the presence of a suitable catalyst, e.g., a basic catalyst such as pyridine. Representative monoisocyanates which can be reacted with carbamates to form monocarbamate esters include isocyanates wherein R is methyl, n-butyl, n-hexyl, dodecyl, hexadecyl, tricosyl, tetracosyl, cyclohexyl, phenyl, cyclohexenyl, p-tolyl, benzyl, and the like.

The carbamates of formula (II) also can be prepared by well-known reactions including the reaction of trishaloalkanols and diisocyanates characterized by the formula (B)          O=C=N—R'—N=C=O wherein R' is as previously defined, in the presence of a suitable catalyst, e.g., a basic catalyst such as pyridine. Representative of diisocyanates that can be reacted with trishaloalkanols in the preparation of dicarbamate esters of formula (II) include diisocyanates wherein R' represents 1,6-hexamethylene; 2,4-tolylene; 2,6-tolylene; 1,4-phenylene; 1,4-cyclohexylene; 1,4-naphthylene; 1,12-dodecylmethylene; 1,4-(2-cyclohexeneylene); methylenedi-p-phenylene; isopropylidenedi-p-phenylene and the like, and mixtures thereof.

The polymeric materials that can be rendered flame retardant in the practice of this invention are normally solid polymers, including homopolymers, copolymers, and blends of at least two polymers selected from homopolymers or copolymers, including polymers derived from the polymerization of monomeric materials having ethylenic unsaturation, e.g., polymers of aliphatic 1-olefins (polyolefins); poly(vinyl-substituted aromatic compounds), such as polystyrene, poly(vinyl halides), such as poly(vinylchloride); poly(vinyl acetates); polyamides; polyesters; and the like. Said polymers are advantageously flame retarded by the addition thereto of the (trishaloalkyl) N-hydrocarbylcarbamates of this invention. Additionally, the aforesaid tris(haloalkyl) N-hydrocarbylcarbamate flame retardants are particularly suitable for use in homopolymers and copolymers derived from 1-monoolefins having 2 to 18 carbon atoms. In most instances, the presently preferred polymers are ethylene or propylene homopolymers, or copolymers of ethylene or propylene with minor amounts of monomers copolymerizable therewith such as propylene or ethylene, butene-1, hexene-1, octene-1 and the like. Polymers wherein at least 50 mol percent is derived from the polymerization of ethylene or propylene monomeric units are preferred. Even more preferred are polymeric materials wherein at least 90 mol percent of the polymer is derived from ethylene or propylene monomer units and from about 0.5 to 10 mol percent of another comonomer unit selected from ethylene, propylene, butene-1, pentene-1, or hexene-1.

The flame retardant tris(haloalkyl) N-hydrocarbylcarbamate can be employed in amounts of from about 1 part to about 20 parts by weight per 100 parts of polymer by weight. Preferably, the carbamate additives are incorporated in amounts of from about 3 parts to about 10 parts by weight per 100 parts of polymer by weight.

The efficiency of the flame retardants set out hereinbefore can be improved by the addition thereto of metal oxides such as arsenic trioxide, antimony trioxide, and bismuth trioxide. Antimony oxide, preferably as the trioxide, is preferably employed along with the tris(haloalkyl) N-hydrocarbylcarbamate additives in order to enhance the effectiveness of the flame retardant. Any amount of metal oxide can be added; however, generally metal oxide in amounts of from about 0.1 part to about 5 parts by weight per 100 parts of polymer by weight are employed with good results. Preferably, the metal oxides are employed in amounts of from 1 part to 2.5 parts by weight per 100 parts by weight of polymer. Bismuth oxide or arsenic oxide can be employed in lieu of antimony trioxide as an adjuvant for the flame retardant additives, but are less frequently employed in the preparation of commercial polymer formulations.

In the preparation of the flame retardant polymeric compositions, suitable methods of preparation comprise admixing the flame retardant additives in conventional polymer process equipment for a sufficient period of time and at adequate temperatures to intimately combine polymer as well as carbamate flame retardant additive and metal oxide when employed. Suitable methods of incorporation include dry blending with polymer powders or pellets in tumble mixers, Henschel mixers, and the like. The polymer and additives can be admixed in screw extruders, Banbury mixers, Brabender mixers, roll mills, and the like, in order to blend the additives with molten polymer or polymer mixtures. The additives can be sprayed on the polymer powder from a solution or dispersion in acetone, methanol, cyclohexane, aromatic hydrocarbons such as benzene, and the like, prior to pelletizing of the polymeric compositions. In general, when solvent is employed, it is usually removed by evaporation prior to final processing of the polymer into its final form.

In addition, conventional additives such as fillers, pigments, plasticizers, thermal stabilizers, antioxidants, lubricating and processing additives such as fatty acid salts of stearic acid, e.g., calcium stearate, can be incorporated during admixture of the flame retardant additives of this invention with the polymer in accordance with the methods described hereinbefore.

Set out hereafter are examples in further illustration of the invention, which should not be considered as unduly limitative of the scope of the invention.

EXAMPLE I

The flame retardant additives 3-bromo-2,2-bis(bromomethyl)propyl N-phenylcarbamate, hereinafter referred to as "A," di[3-bromo-2,2-bis(bromomethyl)propyl]-1,6-hexamethylenedicarbamate, hereinafter designated as "B," and di[3-bromo-2,2-bis(bromomethyl)propyl]-2,4/2,6-tolylenedicarbamate, hereinafter designated as "C," were individually added to polypropylene having a nominal melt flow value of about 4. In each evaluation the same polypropylene was employed and was dry blended with the flame retardant additive and antimony trioxide on a 2-roll mill at 320–360° F. The resulting 2-roll mill blends were compression molded at 325–375° F. into ⅛-inch thick test specimens. The burning characteristics of the test specimens were determined by ASTM D2863-70. The limiting oxygen index (L.O.I.), $n$, of the material was calculated as follows:

$$n, \text{percent} = (100) \times O_2/(O_2 + N_2)$$

The limiting oxygen index represents the minimum volume fraction of oxygen required in an oxygen/nitrogen atmosphere to sustain burning of the plastic test sample. $N_2$ and $O_2$ are the volumetric flow of nitrogen and oxygen respectively. Limiting oxygen index values of at least 25 establish that the polymeric composition containing said additives is substantially nonburning. Polypropylene, in the absence of flame retardant additives, has an oxygen index value of about 18. The results of the tests were as follows:

| Flame retardant additive | Amount of additive, parts per 100 php.* | Amount of $Sb_2O_3$* | L.O.I. |
|---|---|---|---|
| A | 2.5 | 1.25 | 25.2 |
|   | 5.0 | 2.50 | 26.6 |
| B | 2.50 | 1.25 | 27.7 |
|   | 5.12 | 2.56 | 30.3 |
| C | 2.5 | 1.25 | 25.3 |
|   | 5.15 | 2.58 | 25.6 |

*Parts of additive by weight per 100 parts of polymer by weight.

As indicated by the above data, it is readily apparent that the flame retardant additives of this invention produce flame retardant polymeric compositions superior to those of the polymeric compositions which do not contain flame retardant additives.

EXAMPLE II

A mixture of 10.0 g. (0.031 mole) 3-bromo-2,2-bis-(bromomethyl)-1-propanol, 50 ml. benzene, 0.1 g. pyridine and 4.17 g. (0.035 mole) phenylisocyanate was placed in a reaction flask equipped with a stirrer, condenser and a thermometer. The stirred reaction mixture was boiled for one hour. After cooling to room temperature, the reaction mixture was concentrated on a rotary evaporater. The residual solid was recrystallized from a mixture of ether and hexane to give 12.0 g. (87% of theory) of white solid which melted at 105–106.5° C. The white solid was shown to be 3-bromo-2,2-bis(bromomethyl)propyl N-phenylcarbamate ($C_{12}H_{14}Br_3NO_2$) by infrared, nuclear magnetic resonance (NMR), and elemental analyses. Calculated for $C_{12}H_{14}Br_3NO_2$: C, 32.5; H, 3.2; N, 3.2; Br, 54.1. Found: C, 32.8; H, 3.2; N, 3.5; Br, 54.5. This compound is a new composition of matter.

EXAMPLE III

A change of 180 g. (0.0554 mole) 3-bromo-2,2-bis(bromomethyl)-1-propanol, 4.44 g. (0.0264 mole) 1,6-hexamethylene diisocyanate, 100 ml. benzene, and 2 drops of pyridine was placed in a 250 ml. reaction flask equipped with a magnetic stirrer, water cooled condenser, and a thermometer. The clear solution was stirred and refluxed for about eight hours. After cooling to room temperature, the reaction mixture was concentrated on a roatry evaporator. The residual viscous liquid was taken into about 40 ml. of hot ethanol, and on cooling 6.2 g. of a white solid crystallized (m.p. 119–123° C.). An additional recrystallization from ethanol gave 5.5 g. of white solid which melted at 126.5–128.5° C. This material was shown to be di[3-bromo-2,2-bis(bromomethyl)propyl]-1,6-hexamethylenedicarbamate ($C_{18}H_{30}Br_6N_2O_4$) by elemental analysis. Calculated for $C_{18}H_{30}Br_6N_2O_4$: C, 26.5; H, 3.69; N, 3.42; Br, 58.7. Found: C, 26.09; H, 3.56; N, 3.28; Br, 58.3. This compound is a new composition of matter.

EXAMPLE IV

A charge of 20.0 g. (0.0615 mole) 3-bromo-2,2-bis-(bromomethyl)-1-propanol, 6.0 g. (0.0345 mole) tolylene diisocyanates (80/20 mixture of the 2,4/2,6 isomers), 100 ml. benzene, and 2 drops of pyridine was placed in a 250 ml. reaction flask equipped with a magnetic stirrer. The stirred reaction mixture was heated for one hour. After cooling to room temperature, the solution was concentrated on a rotary evaporator to a liquid residue which solidified on cooling. After two recrystallizations from benzene, 14.1 g. of a white solid was isolated (m.p. 138–140° C.). An additional 1.75 g. of product was obtained from the mother liquor. the product di[3-bromo-2,2-bis-(bromomethyl)propyl]2,4/2,6-tolylenedicarbamate

was characterized by infrared, NMR (nuclear magnetic resonance) and elemental analyses. Calculated for $C_{19}H_{24}N_2Br_6O_4$: C, 27.75; H, 2.94; Br, 58.25; N, 3.42. Found: C, 30.70; H, 2.94; Br, 55.6; N, 3.53. The product was recrystallized two additional times from ethanol to give a white solid melting at 137–140° C. This sample ($C_{19}H_{24}N_2Br_6O_4$) was characterized by elemental analysis. Calculated for $C_{19}H_{24}N_2Br_6O_4$: C, 27.75; H, 2.94; Br, 58.25; N, 3.42. Found: C, 28.36; H, 2.92; Br, 56.65; N, 3.24.

Further modifications of the teachings of this invention by the use of tris(haloalkyl) N-hydrocarbylcarbamates to impart flame retardancy to polymeric materials will be apparent to those skilled in the art.

We claim:

1. A polymeric composition comprising a polyolefin and at least one of the compounds selected from (I) 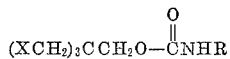

wherein R represents a monovalent acyclic radical, a monovalent cyclic radical or combination thereof, and X represents bromine, chlorine, or iodine; and (II) 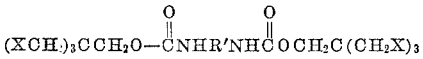

wherein R' represents a divalent acyclic radical, a divalent cyclic radical or combination thereof, and X is as previously defined.

2. A polymeric composition in accord with claim 1, wherein the polyolefin is derived from the polymerization of aliphatic 1-olefins having from 2 to 8 carbon atoms.

3. The polymeric composition of claim 2 wherein at least 90 mol percent of the polyolefin is derived from the polymerizaiton of propylene and from about 0.5 to 10 mol percent of the polyolefin is derived from the polymerization of a comonomer selected from ethylene or butene-1.

4. A polymeric composition in accordance with claim 1 wherein said at least one of said compounds is present in said polymeric composition in a concentration of from about 1 to about 20 parts by weight per 100 parts by weight of said polyolefin.

5. A polymeric composition in accordance with claim 4 wherein said polyolefin has at least 90 mol percent of its polymeric material derived from propylene.

6. A polymeric composition in accordance with claim 5 wherein said at least one of said compounds is di[3-bromo-2,2-bis(bromomethyl)propyl] - 1,6-hexamethylenedicarbamate.

7. A polymeric composition in accordance with claim 5 wherein said at least one of said compounds is 3-bromo-2,2-bis(bromomethyl)propyl N-phenylcarbamate.

8. A polymeric composition in accordance with claim 5 wherein said at least one of said compounds is di[3-bromo-2,2 - bis(bromomethyl)propyl]-2,4/2,6-tolylenedicarbamate.

9. A polymeric composition in accordance with claim 1 wherein the X of the compounds of formula (I) represents bromine or iodine.

References Cited
UNITED STATES PATENTS

| | | | |
|---|---|---|---|
| 3,105,845 | 10/1963 | Fetterly et al. | 260—453 |
| 3,313,867 | 4/1967 | Blackburn et al. | 260—895 |
| 3,336,367 | 8/1967 | Amann et al. | 260—482 |
| 3,419,532 | 12/1968 | Jackson | 260—77.5 |
| 3,507,933 | 4/1970 | Larsen et al. | 260—869 |
| 3,639,304 | 2/1972 | Raley, Jr. | 260—2.5 |
| 3,700,625 | 10/1972 | Brady et al. | 260—45.75 |

OTHER REFERENCES

Shriner et al., "The Systematic Identification of Organic Compounds," 4th ed., p. 206.

DONALD E. CZAJA, Primary Examiner

R. A. WHITE, Assistant Examiner

U.S. Cl. X.R.

260—468 E, 471 C, 482 C